2,860,960
Patented Nov. 18, 1958

---

2,860,960

ABRASIVE ARTICLES AND METHOD FOR MAKING THE SAME

John R. Gregor, Detroit, Mich., assignor to Abrasive and Metal Products Co., a corporation of Michigan No Drawing. Application November 10, 1953
Serial No. 391,395

10 Claims. (Cl. 51—298)

The present invention relates to improved abrasive articles and to a method for making them. More particularly the invention relates to abrasive articles of the type which comprise abrasive grains bonded together with a heat hardened resin which has been preliminarily modified by the incorporation therewith of a novel plasticizer.

Heretofore, abrasive wheels, stones, and the like have been manufactured by bonding together abrasive grains with a wide variety of heat hardenable resins such as phenol-aldehyde resins, aromatic amine-aldehyde resins, amine modified phenol-aldehyde resins and other modifications of such basic types of resins.

One of the difficulties which has been experienced with resinous bonds of the type which do not soften from the heat which is produced during use, such as the phenol-aldehyde resins, is that the surface produced on the ground article is relatively rough. Another difficulty commonly experienced, when attempting to use a relatively high abrasive content grinding wheel is that heavy pressure is required in order to obtain an economically fast cutting rate.

It is the primary object of the present invention to provide an improved resinous bond of the phenol-aldehyde type for abrasive grains for use in the manufacture of abrasive articles having superior grinding characteristics.

A further object of this invention is to provide a new and novel additive for resinous bonds of the phenol-aldehyde type for use in bonding abrasive grains into useful abrasive articles.

Another object of this invention is to provide a grinding wheel characterized by a faster cutting rate and improved grinding efficiency relative to heretofore known grinding wheels.

A still further object of this invention is to provide an improved resinous bond of the phenol-aldehyde type for abrasive grains which permits the efficient use of a larger proportion of abrasive grain in the article than is usual, and enables the attainment of a faster cutting rate at lower pressure than is normally required.

Other objects and advantageous features of the invention will become apparent upon considering the present disclosure in its entirety.

In accordance with the present invention, it has now been discovered that the above and related objects may be completely achieved by incorporating in resinous bonds of the phenol-aldehyde type, an additive or plasticising agent consisting of a condensation product of ethylene oxide and a hydrophobic base formed by the condensation of propylene oxide and propylene glycol and having a molecular weight between about 2000 and about 7500. The presence of such an additive in phenol-aldehyde resinous bonds has been found, when the resinous bond is used to bond abrasive grains, to soften the bond between the grain and the resin and to thereby enable a faster cutting rate, at a given pressure, than is customarily obtained. Moreover, at the faster cutting rate, the metal removal efficiency or the ratio of the square of material removed to wheel loss is higher than is normally obtained with wheels that are comparable except for the presence of the additive or plasticising agent of this invention.

The improved grinding wheels or abrasive articles of this invention may contain any abrasive grain which is conventionally employed for such purposes such as silicon carbide, other hard carbides, diamonds, glass or any of the varieties of alumina such as emery, corundum or fused alumina, quartz and garnet.

The resinous bonds which are improved by the incorporation therewith of the additive or plasticiser of this invention are the phenol-aldehyde resins, such as phenol-formaldehyde resins, phenol-furfural resins, etc., and including such resins modified by urea, melamine and amines, and are particularly advantageous in conjunction with phenol-formaldehyde resins. The phenol-aldehyde resins may be used either in the form of dry powders or in the form of liquids, a wide variety of which are commercially available. Where the phenol-aldehyde resin is in the form of a powder, a suitable solvent or wetting agent for the powdered resin may be used to assist in wetting the abrasive grain and in converting the resin into an infusable condition. A suitable material for this purpose is furaldehyde. Alternatively, phenol-aldehyde resin in liquid form may be used in conjunction with the powdered resin. Where furfuraldehyde or a liquid phenol-aldehyde resin is used, the proportion which is required is merely that amount which would produce a mix that will wet the abrasive grains.

The new additive or plasticizer of this invention is a condensation product of ethylene oxide and a hydrophobic base formed by the condensation of propylene oxide with propylene glycol and having a molecular weight between about 2000 and 7500. These materials are available commercially under the trade designation "Pluronics," in a plurality of stages of condensation such that the molecular weight varies between about 2000 for the liquid type up to a molecular weight of 7500 for a material in flake form. The materials which are marketed under the trade designation "Pluronics" are described in greater detail in U. S. Patents 2,674,619 and 2,677,700. An illustrative method for making one such material which is suitable for the purposes of this invention is as follows: In a one-liter 3-neck round bottom flask equipped with a mechanical stirrer, reflux condenser, thermometer and propylene oxide feed inlet, there were placed 57 grams (0.75 mol) of propylene glycol and 7.5 grams of anhydrous sodium hydroxide. The flask was purged with nitrogen to remove air and heated to 120° C. with stirring, and until the sodium hydroxide was dissolved. Then sufficient propylene oxide was introduced into the mixture as fast as it would react until the product possessed a calculated molecular weight of 2380. The product was cooled under nitrogen, the NaOH catalyst neutralized with sulfuric acid and the product filtered. The final product was a water-insoluble polyoxypropylene glycol having an average molecular weight of 1620 as determined by hydroxyl number or acetylation analytical test procedure. The foregoing polyoxypropylene glycol having an average 1620 molecular weight was placed in the same apparatus as described above, in the amount of 500 grams (0.308 mol), to which there was added 5 grams of anhydrous sodium hydroxide. One hundred and five grams of ethylene oxide was added at an average temperature of 120° C., using the same technique as employed above. The amount of added ethylene oxide corresponded to 17.4% of the total weight of the polyoxypropylene glycol base plus the weight of added ethylene oxide.

It is thought that these additives act partially as a plasticizer for the phenol-aldehyde resin and partially inter-react with the resinous bond as the temperature is increased in use to cause the bond to soften and to approximate or approach the type of bond which exists in abrasive articles that are bonded with rubber or the like. While the exact mechanism of the cooperation between the phenol-aldehyde resin and the additive of this invention is not completely understood, the benefits of its presence in the compositions of this invention have been clearly and unmistakably observed. The proportion of additive of the above type which may be advantageously employed, varies over a wide range and is not critical. Some advantage is gained from the presence of extremely minor quantities and the benefits continue to increase as the proportion of the additive is increased up to a proportion of about 25% by weight of the total bond. Above about 25% of the total bond, no additional advantage is gained although greater quantities may be tolerated without experiencing undesirable effects. A practicable proportion is about 0.8%–25% and for the majority of abrasive articles, 0.5–4% by weight of the total bond is satisfactory and is preferred.

Optionally, conventional fillers may also be employed in the compositions of this invention and for certain types of applications such as grinding wheels, their incorporation is preferred. Fillers which are compatible with the other ingredients in the compositions of this invention include powdered cryolite, feldspar, iron oxide and calcined kaolin. If desired, the compositions may optionally include lime, and where furfuraldehyde is employed, the presence of lime is recommended. When lime is employed, it is useful in quantities of approximately 1% to 10% by volume of the total bond.

The improved compositions of this invention may, for optimum results, vary in proportions as set forth in Formula I. The total bond refers to the resinous bond including resin, plasticizer, filler and other modifiers such as lime.

FORMULA I

| | |
|---|---|
| Abrasive grain | 50–64% by volume (based on total volume of the article). |
| Phenol-aldehyde resin | 12–30% by volume (based on total volume of the article). |
| Plasticizing agent (condensation product of ethylene oxide, propylene glycol and propylene oxide having a molecular weight between 2000 and 7500) | .8–25% by weight of the total resin. |

These compositions may optionally include 0 to 50% filler volume of the total bond, 1% to 10% lime by volume of the total bond.

The method of forming abrasive articles in accordance with this invention comprises the steps of uniformly admixing abrasive grains with a phenol-aldehyde resin in powdered or liquid form and the plasticizer of this invention which consists of the condensation product of ethylene oxide and a hydrophobic base formed by the condensation of propylene oxide and propylene glycol and having a molecular weight between about 2000 and 7500. The order in which the individual steps of admixing the abrasive grains with the resin and the plasticizing agent is not particularly critical. The abrasive grains may be first wet with the solvent for the phenol-aldehyde resin such as furfuraldehyde, and the plasticizing agent added thereto, after which the powdered phenol-aldehyde resin is incorporated and the entire mixture uniformly admixed until the abrasive grains are evenly coated. Alternatively, the furfuraldehyde and additive of this invention may be preliminarily admixed before the abrasive grains are wetted, or the abrasive grains may be admixed with the powdered resin prior to incorporating the additive of this invention or the additive in combination with furfuraldehyde. After the grains are uniformly coated, abrasive articles are formed by conventional pressing techniques and the resinous bond is converted to an infusible condition in accordance with conventional procedures.

The following examples will serve to illustrate the composition and method of this invention in greater detail.

Example I

A wheel, 20 inches in diameter, 2½ inches thick and having an arbor hole 6 inches in diameter (20″ x 2½″ x 6″) was made from the following mix, all parts being by weight:

| | Parts |
|---|---|
| 10 grit fused aluminum oxide | 29.5 |
| 12 grit fused aluminum oxide | 29.5 |
| 14 grit fused aluminum oxide | 29.5 |
| "Bakelite O222" powdered resin | 8.5 |
| Furfuraldehyde | 1.4 |
| "Pluronic L-62" | 0.78 |
| Powdered cryolite | 8.2 |
| Lime | 1.9 |

The three sizes of abrasive grains were placed in a Read mixer and thoroughly mixed with the furfuraldehyde and the "Pluronic L-62." "Pluronic L-62" is a condensation product of ethylene oxide and a hydrophobic base formed by the condensation of propylene glycol with propylene oxide having a molecular weight of about 2000 and available from Wyandotte Chemicals Corp. The "Bakelite O222," which is a powdered heat-hardenable phenolformaldehyde condensation product which is convertible by heat to a tough, infusible, insoluble resinoid, cryolite and lime were then added to the wet abrasive grains and the whole mixed vigorously until all of the powdered material had been picked up and coated on the abrasive grains. A portion of this mixture was placed in a conventional mold and pressed into the form of a wheel. The wheel was then heated to cure the resin and the wheel finished in accordance with usual practices. The completed wheel contained the following volume percentage analysis:

| | Volume percent |
|---|---|
| 10 grit fused aluminum oxide | 19.33 |
| 12 grit fused aluminum oxide | 19.33 |
| 14 grit fused aluminum oxide | 19.34 |
| "Bakelite O222" powdered resin | 19.21 |
| Furfuraldehyde | 3.60 |
| "Pluronic L-62" | 0.39 |
| Powdered cryolite | 7.00 |
| Lime | 1.40 |
| Voids | 10.40 |

It was found to be very satisfactory for grinding steel billets.

Example II

A wheel of similar dimensions to that of Example I was made in a similar manner having the following analysis in volume percentage of the wheel.

| | Volume percent |
|---|---|
| 10 grit fused aluminum oxide | 19.33 |
| 12 grit fused aluminum oxide | 19.33 |
| 14 grit fused aluminum oxide | 19.34 |
| "Bakelite O222" powdered resin | 15.4 |
| Furfuraldehyde | 3.2 |
| "Pluronic L-62" | 1.0 |
| Powdered cryolite | 7.0 |
| Lime | 1.4 |
| Voids | 14.0 |

Two additional wheels were made having a similar composition except that the proportion of "Pluronic L-62" was changed to 2%, and 3% in the respective wheels with a corresponding decrease in the voids.

The wheels were used in grinding 1015 hot rolled carbon steel billets in comparison to a standard wheel, that is, a wheel otherwise similar except it did not contain "Pluronic L-62," having an identical density to that of the wheels containing "Pluronic L-62." The grinding conditions were maintained identical with all wheels and the results are set forth in Table I.

TABLE I

| | Wheel Loss, Pounds/hour | Steel Loss, Pounds/hour | (Steel Loss)$^2$/Wheel Loss |
|---|---|---|---|
| Standard Wheel | 7.2 | 73 | 738 |
| Wheel #1 (1% Pluronic L-26) | 8.8 | 86 | 847 |
| Wheel #2 (2% Pluronic L-62) | 9.4 | 87 | 809 |
| Wheel #3 (3% Pluronic L-62) | 9.6 | 88 | 808 |

It will be appreciated that due to the faster rate of grinding and the increased efficiency of steel removal that substantial savings are made possible by the use of the wheels and wheel and wheel compositions of this invention.

What is claimed is:

1. An abrasive wheel comprising 50% to 64% abrasive grains by volume of the wheel, 12% to 30% by volume of said wheel of a phenol-aldehyde bond, and 0.8% to 25% by weight of said bond of a plasticizer for said bond consisting of a condensation product of ethylene oxide and a hydrophobic base formed by the condensation of propylene oxide with propylene glycol and having a molecular weight between about 2000 and about 7500.

2. An abrasive wheel comprising 50% to 64% abrasive grains by volume of the wheel, 12% to 30% by volume of said wheel of a phenolaldehyde bond, and 0.8% to 15% by weight of said bond of a plasticizer for said bond consisting of a condensation product of ethylene oxide and a hydrophobic base formed by the condensation of propylene oxide with propylene glycol and having a molecular weight between about 2000 and 7500.

3. An abrasive wheel comprising 50% to 64% by volume of said wheel of abrasive grains, 12% to 30% by volume of said wheel of a phenol-aldehyde bond, at least one filler selected from the group consisting of cryolite, iron oxide, feldspar and kaolin in an amount of 0 to 50% by volume of said bond, and 0.5% to 4% by weight of said bond of condensation product of ethylene oxide and a hydrophobic base formed by the condensation of propylene oxide and propylene glycol and having a molecular weight between about 2000 and about 7500.

4. An abrasive wheel comprising 50% to 64% by volume of said wheel of abrasive grains, 12% to 30% by volume of said wheel of a phenolaldehyde bond, at least one filler selected from the group consisting of cryolite, iron oxide, feldspar and kaolin in an amount of 0% to 50% by volume of said bond, and 0.8% to 25% by weight of said bond of a condensation product of ethylene oxide and a hydrophobic base formed by the condensation of propylene oxide and propylene glycol and having a molecular weight between about 2000 and about 7500, and 1 to 10% lime.

5. An abrasive wheel comprising 50% to 64% by volume of said wheel of abrasive grains, 12% to 30% by volume of said wheel of a phenolaldehyde bond, at least one filler selected from the group consisting of cryolite, iron oxide, feldspar and kaolin in an amount of 0% to 50% by volume of said bond, and 0.8% to 15% by weight of said bond of a condensation product of ethylene oxide and a hydrophobic base formed by the condensation of propylene oxide and propylene glycol and having a molecular weight between about 2000 and about 7500, and 1 to 10% lime.

6. A method for making improved grinding wheels which comprises the step of incorporating in a mixture comprising 50% to 64% abrasive grains by volume of the wheel and a phenolaldehyde bond holding the said abrasive grains together, 0.8% to 25% by weight of said bond of a plasticizer for said bond consisting of a condensation product of ethylene oxide and a hydrophobic base formed by the condensation of propylene oxide with propylene glycol and having a molecular weight between about 2000 and about 7500.

7. A method for making improved grinding wheels which comprises the step of incorporating in a mixture 50% to 64% abrasive grains by volume of the wheel and a phenolaldehyde bond holding the said abrasive grains together, 0.8% to 15% by weight of said bond of a plasticizer for said bond consisting of a condensation product of ethylene oxide and a hydrophobic base formed by the condensation of propylene oxide with propylene glycol and having a molecular weight between about 2000 and 7500.

8. A method for making improved grinding wheels which comprises the step of incorporating in a mixture 50% to 64% by volume of said wheel of abrasive grains, 12% to 30% by volume of said wheel of a phenolaldehyde bond, at least one filler selected from the group consisting of cryolite, iron oxide, feldspar and kaolin in an amount of 0 to 50% by volume of said bond, and 0.5% to 4% by weight of said bond of a condensation product of ethylene oxide and a hydrophobic base formed by the condensation of propylene oxide and propylene glycol and having a molecular weight between about 2000 and about 7500.

9. A method for making improved grinding wheels which comprises the step of incorporating in a mixture 50% to 64% by volume of said wheel of abrasive grains, 12% to 30% by volume of said wheel of a phenolaldehyde bond, at least one filler selected from the group consisting of cryolite, iron oxide, feldspar and kaolin in an amount of 0% to 50% by volume of said bond, and 0.8% to 25% by weight of said bond of a condensation product of ethylene oxide and a hydrophobic base formed by the condensation of propylene oxide and propylene glycol and having a molecular weight between about 2000 and about 7500, and 1% to 10% lime.

10. A method for making improved grinding wheels which comprises the step of incorporating in a mixture 50% to 64% by volume of said wheel of abrasive grains, 12% to 30% by volume of said wheel of a phenolaldehyde bond, at least one filler selected from the group consisting of cryolite, iron oxide, feldspar and kaolin in an amount of 0% to 50% by volume of said bond, and 0.8% to 15% by weight of said bond of a condensation product of ethylene oxide and a hydrophobic base formed by the condensation of propylene oxide and propylene glycol and having a molecular weight between about 2000 and about 7500, and 1% to 10% lime.

References Cited in the file of this patent

UNITED STATES PATENTS

| | | |
|---|---|---|
| 2,414,474 | March | Jan. 21, 1947 |
| 2,426,441 | Drousfield | Aug. 26, 1947 |
| 2,557,047 | Goepfert et al. | June 12, 1951 |
| 2,656,327 | Van Wirt et al. | Oct. 20, 1953 |
| 2,677,700 | Jackson et al. | May 4, 1954 |

OTHER REFERENCES

Pluronics, Wyandotte Chem. Corp. Pub., Jan. 2, 1953.